United States Patent

Hegg

Patent Number: 5,796,927
Date of Patent: Aug. 18, 1998

[54] RATE MODE HAND CONTROLLER WITH FORCE REFLECTION

[75] Inventor: Jeff Hegg, North Redington Beach, Fla.

[73] Assignee: Honeywell Inc., Minneapolis, Minn.

[21] Appl. No.: 787,780

[22] Filed: Jan. 23, 1997

Related U.S. Application Data

[63] Continuation of Ser. No. 416,946, Apr. 4, 1995, abandoned, which is a continuation of Ser. No. 149,018, Nov. 10, 1993, abandoned, which is a continuation of Ser. No. 715,825, Jun. 14, 1991, abandoned.

[51] Int. Cl.[6] .................... G06F 15/46; G05B 19/18
[52] U.S. Cl. .................. 395/95; 395/96; 318/568.18; 901/23; 901/24
[58] Field of Search ............... 395/95, 96; 318/568.18; 901/23, 34, 24; 295/95, 96

[56] References Cited

U.S. PATENT DOCUMENTS

| Re. 31,581 | 5/1984  | Richer          | 395/95 |
|------------|---------|-----------------|--------|
| 4,156,835  | 5/1979  | Whitney et al.  | 395/95 |
| 4,278,920  | 7/1981  | Ruoff, Jr.      | 395/95 |
| 4,300,198  | 11/1981 | Davini          | 395/96 |
| 4,367,532  | 1/1983  | Crum et al.     | 395/95 |
| 4,580,229  | 4/1986  | Koyamae et al.  | 395/95 |
| 4,604,559  | 8/1986  | Hawkes et al.   | 395/95 |
| 4,819,184  | 4/1989  | Jönsson et al.  | 395/95 |
| 4,925,312  | 5/1990  | Onaga et al.    | 395/95 |
| 5,038,089  | 8/1991  | Szakaly         | 395/95 |
| 5,072,361  | 12/1991 | Davis et al.    | 395/95 |
| 5,129,044  | 7/1992  | Kashiwagi et al.| 395/95 |
| 5,224,032  | 6/1993  | Wörn et al.     | 395/96 |

*Primary Examiner*—George B. Davis
*Attorney, Agent, or Firm*—Robert E. Greenstien

[57] ABSTRACT

A rate mode robotic control system in which displacement of a hand-control element from a null position generates a robotic control signal to command acceleration and/or velocity of a controlled element. A force generator urges the hand-control element to the null position with a force proportional to the displacement of the hand-control element from the null position. A reflected force feedback signal increases or decreases the force urging the hand-control to the null position as a function of the resistance encountered by the controlled element.

2 Claims, 4 Drawing Sheets

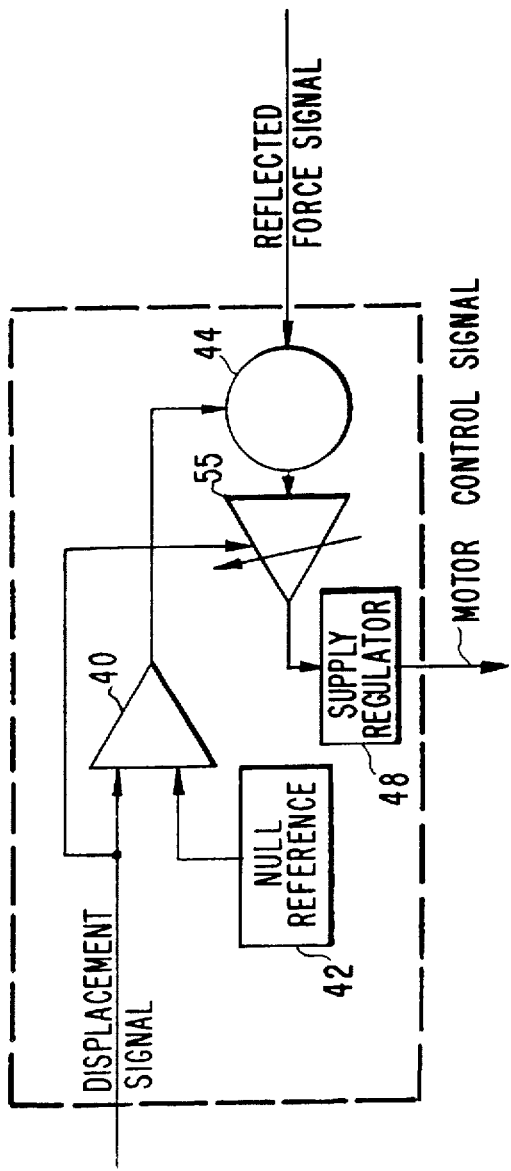
FIG.7
FIG.8
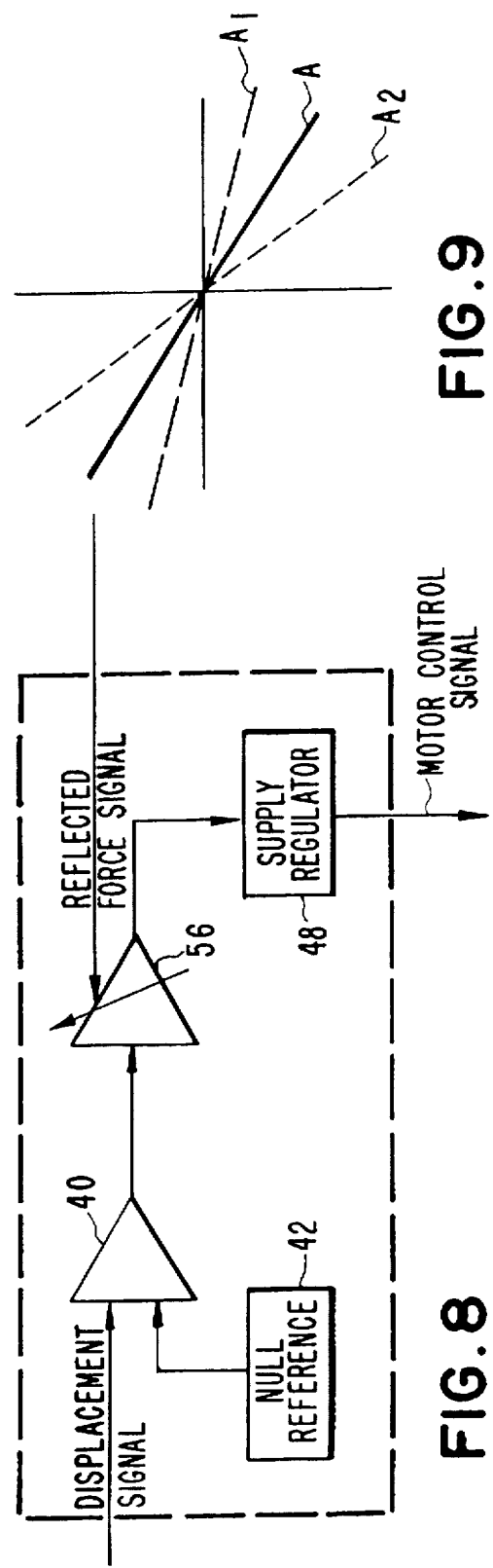
FIG.9

RATE MODE HAND CONTROLLER WITH FORCE REFLECTION

This application is a continuation of application Ser. No. 08/416,946, filed on Apr. 4, 1995, now abandoned, which is a continuation of application Ser. No. 08/149,018, filed Nov. 8, 1993, now abandoned, which is a continuation of application Ser. No. 07/715,825, filed Jun. 14, 1991, now abandoned.

BACKGROUND OF THE INVENTION

1. Field of the Invention

The invention relates to an improved rate mode hand controller, and more particularly to a rate mode hand controller in which the resistance encountered by the controlled element is reflected back to the operator via a hand-control element.

2. Description of the Prior Art

In robotics and other similar applications, an operator moves a hand-control element in order to generate signals to command an operating element which is not physically coupled to the hand-control element. In a so-called rate mode hand controller, movement by the operator of the hand-control element controls acceleration and/or velocity of the controlled element. In prior art rate mode hand controllers, a spring force opposes the movement of the hand-controlled element so that the force the operator must exert increases linearly with displacement from a null or home position for the hand-control element. Here, it should be noted that this spring force returns the hand-control element to its null position when the operator applied force is removed. FIG. 1 is a simplified block diagram of a typical rate mode hand-control system. A hand-control element 10 is maintained in its null position by a spring 12. An operator can move the hand-control element 10 in a positive (+) or negative (−) direction (as indicated by the arrows) from the null position 15. In FIG. 2 the line A illustrates the return to null force vs. hand-control element displacement for this prior art system.

A displacement transducer 14 generates an output signal proportional to the displacement of the hand-control element. This displacement transducer output signal is coupled to a robotic controller 16 whose output in turn controls the acceleration or velocity of a controlled element 20.

Position mode hand controllers as distinguished from rate mode hand controllers, ideally have no force which the operator must overcome to move the hand-control element. In position mode controllers, no force is applied to the hand-control element to return it to a home or null position. In position mode controllers, the position of the hand-control element is indicative of the position of the controlled element, and certain prior art position mode hand controllers control employ force reflection so that if the controlled element encounters an obstacle as it moves, feedback to the hand-control element applies a force to oppose the operator's further moving the hand-control element along the axis where the obstacle was encountered.

SUMMARY OF THE INVENTION

An object of the present invention is to provide a rate mode hand-control system with force reflection from the controlled object to the hand-controller to provide a "tactile" feel. According to the invention, in a rate mode robotic control system in which displacement of a hand-control element from a null position generates a robotic control signal to command acceleration and/or velocity of a controlled element as a function of the magnitude of the displacement. A force generator actuator urges the hand-control element to the null position with a force proportional to the displacement of the hand-control element from the null position. In addition, a reflected force feedback signal increases or decreases the force urging the hand-control to the null position as a function of the resistance encountered by the controlled element.

BRIEF DESCRIPTION OF THE DRAWINGS

The foregoing and other objects, aspects and advantages will be better understood from the following detailed description of a preferred embodiment of the invention with reference to the drawings, in which:

FIGS. 5, 6, 7, and 8 are simplified diagrams illustrating the control logic for various embodiments of the invention.

FIG. 9 is a force vs hand-control element position for the embodiment of FIG. 8.

DETAILED DESCRIPTION OF A PREFERRED EMBODIMENT OF THE INVENTION

Figure 1:
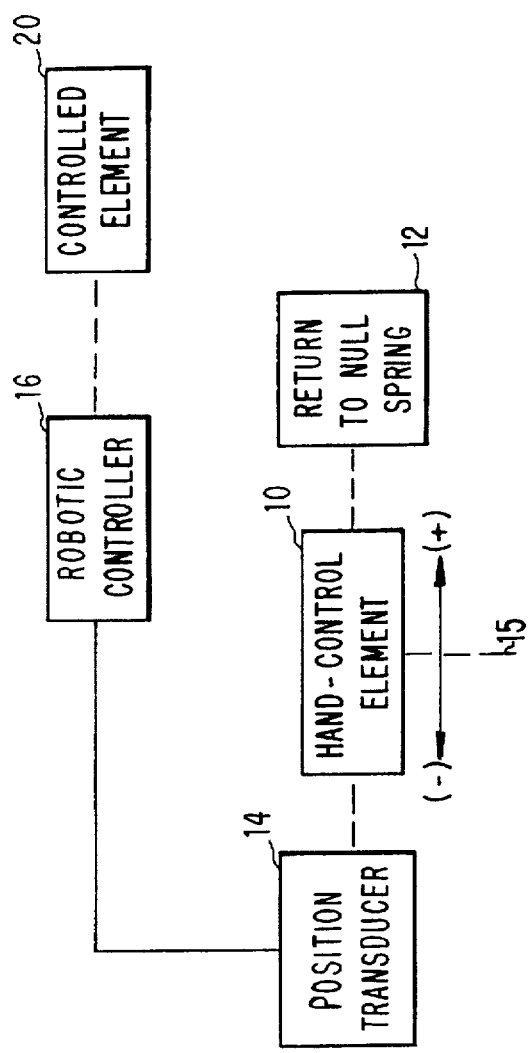
FIG. 1 is a simplified block diagram of a prior art rate mode hand-control system.
Figure 2:
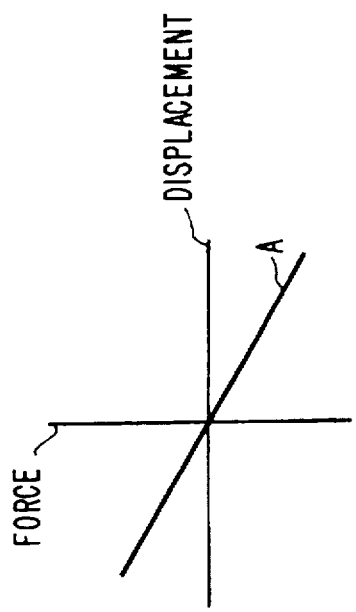
FIG. 2 is a diagram of force vs. hand-control element position for the system illustrated in FIG. 1.
Figure 3:
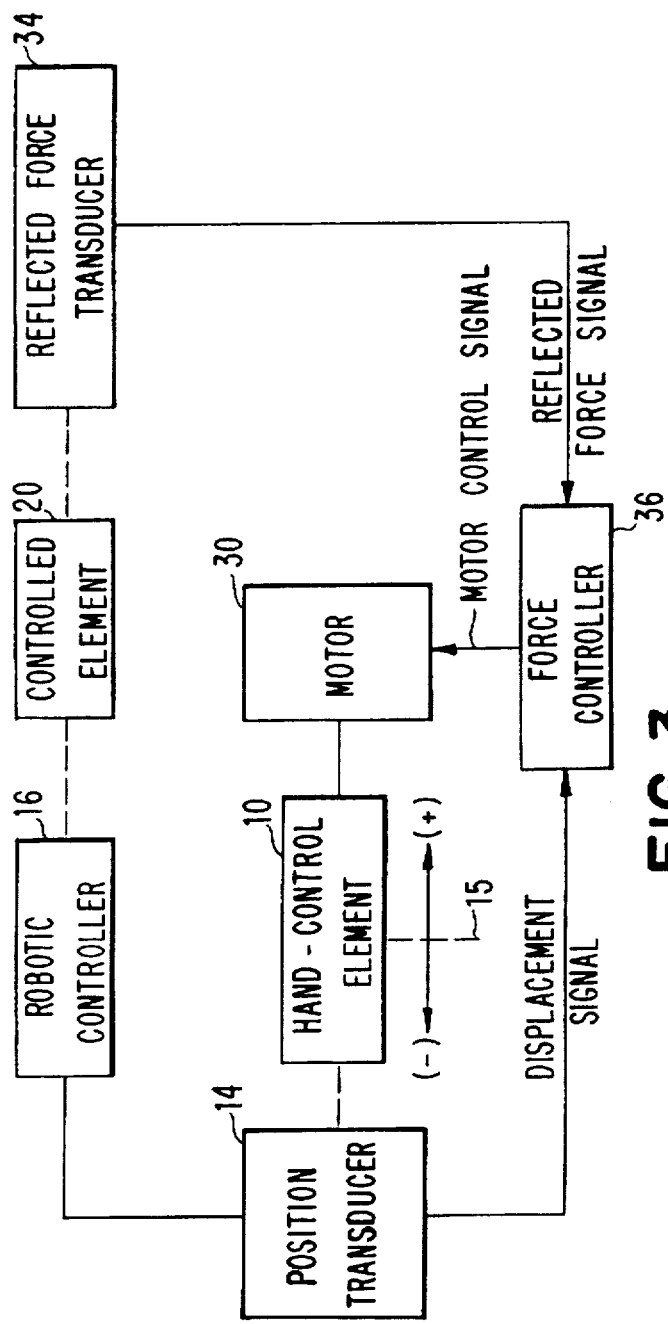
FIG. 3 is a block diagram of one embodiment of a rate mode hand-control system with force reflection in accordance with the teachings of this invention.

Referring now to FIG. 3, as in prior art rate mode systems, a position transducer 14 coupled to a hand-control element 10 provides an output signal to a robotic controller 16. In response to the output signal from the transducer 14, the robotic controller 16 varies the acceleration and/or velocity of the controlled element 20. The magnitude and sense of the commanded acceleration or velocity is a function of the displacement of the hand-control element 10 from a null position 15.

In accordance with this invention, a motor 30, such as a brushless d.c. motor, generates a return to null force proportional to the distance the hand-control element 10 is displaced from its null position. A displacement signal from transducer 14 is compared with a reference to generate a centering force signal. A typical centering force characteristic, labeled A in the force vs. displacement diagram of FIG. 4, urges the hand-control element 10 in a direction to restore it to its null position. The magnitude of this nominal centering force A is a function of the displacement of the hand-control element from its null position 15.

A transducer 34 generates a reflected force feedback signal proportional to the magnitude resistance between the controlled element 20 and an object. For example, transducer 34 may be a commercially available strange gage force torque sensor. This signal is coupled to a controller 36 to change the force applied by motor 30 to hand-control element 10 in order to give the operator feedback through the hand-control element indicative of the experience of the controlled element. The brushless d.c. motor 30 operates in a stalled operating mode and produces an output torque which is proportional to its input voltage. The position of the hand-control element 10 and the resultant input voltage to the motor establish a point on the force vs. displacement curve of FIG. 4.

The reflected force feedback signal is combined with the centering command signal using one of several alternative strategies. The reflected force feedback signal may be added directly to the hand-control element centering force signal with an appropriate fixed scaling factor. Alternatively, the feedback force signal can be scaled proportionally to the hand-control element displacement and then added to the hand-control element centering force signal. Another alternative implementation of the invention is to use the feedback force signal to select one of a number of predetermined slopes for the hand-control element centering force signal.

Figure 4:
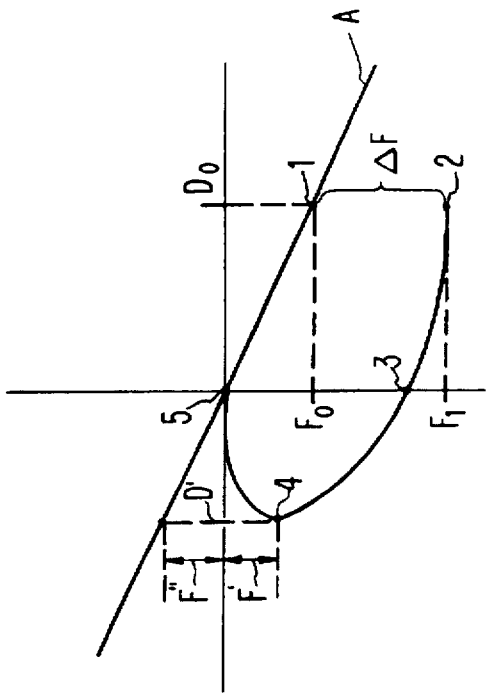
FIG. 4 is a diagram of force vs. hand-control element position showing the effect of force reflection in accordance with one embodiment of the invention.

FIG. 4 is a force vs. displacement diagram illustrating the operation of hand-control element in which the force feedback signal is added directly to the centering force signal after appropriate fixed scaling of the feedback signal. This simplified example illustrates the system operation for a single axis of hand-control element and controlled element motion. The example is for a case where the controlled element makes contact with a surface.

In FIG. 4 the line A in the 2nd and 4th quadrants represents the magnitude of centering force as a function of hand-control element displacement in the absence of contact between the controlled element 20 and an object. A positive displacement $D_0$ causes a negative force $F_0$ in a direction opposing the force applied by the operator (point 1). This force emulates operation of the spring centered hand controllers. Contact of the controlled element 20 with an object that generates a motion retarding force of $\Delta F$ is summed with $F_0$ and the force felt by the operator is $F_1$ (operating point 2). This provides an indication to the operator of contact between the controlled element and a hard surface. The operator has choices to make at this time, such as maintain displacement $D_0$, allow the hand-control element to move toward the null position with his or her hand controlling the motion; or release the hand-control element allowing it to move to the null position in response to the combination of centering and reflected force feedback commands. The third case, where the operator releases hand-control element, provides a understanding of this embodiment of the invention.

Once the hand-control element is released at point 2, it starts moving toward its null position but the robotic controller 16 continues receiving commands to move at a positive velocity due to a displacement D. The force $\Delta F$ may increase, dependent upon the type of robotic control system that is implemented. Once point 3 is reached, the rate command to the robotic controller 16 reaches zero (i.e., displacement D=0) but there is still a force acting on the hand-control element, which will drive it past zero to point 4. During the hand-control element motion from point 3 to point 4, the rate command to the robotic controller 16 changes direction. At point 4, the F' as a result of the reflected force feedback signal equals the centering force and motion of the hand-control element changes direction. The reaction force on the controlled element continues to decrease because the hand-control element has been moved to a negative position D' and the centering command exceeds the feedback force, causing the grip to move to the null position point 5 with the robotic controlled element touching the surface with zero force and the hand-control element at the null position.

FIGS. 5, 6, 7 and 8 illustrate embodiments of the controller 36 to implement the feedback strategies mentioned above. Here it should be noted that since the object of feeding back the reflected force signal is to give the operator a "feel" for what has been encountered by the controlled element, a particular strategy can be chosen to best match a particular application.

Figure 5:
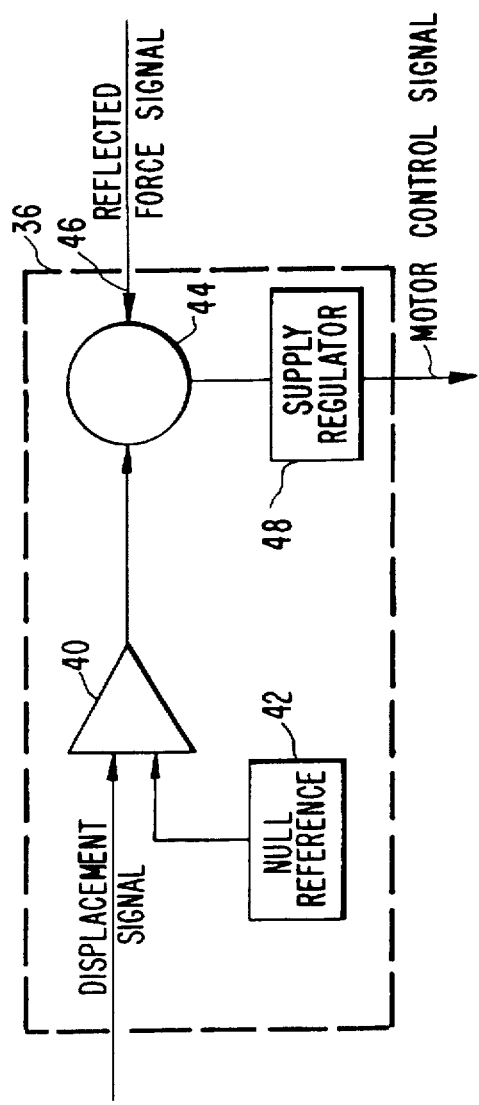

FIG. 5 illustrates a controller 36 in which the motor control signal is generated by summing the output signal of the displacement transducer 14 with the reflected force feedback signal from transducer 34. The output of transducer 14 is coupled to one input of a universal amplifier 40 whose other input is coupled to a reference voltage 42 that establishes the null or home position for the hand-control element 10. The magnitude of the output signal of the amplifier 40 is a function of the difference between the displacement signal input and the reference. The output of the amplifier 40 is coupled as one input to a summing junction 44 whose other input 46 is the reflected force output signal from transducer 34. The output of the summing junction 44 is coupled to motor power supply regulator 48 whose output in is as a function of the magnitude of output of the summing junction 44.

Figure 6:
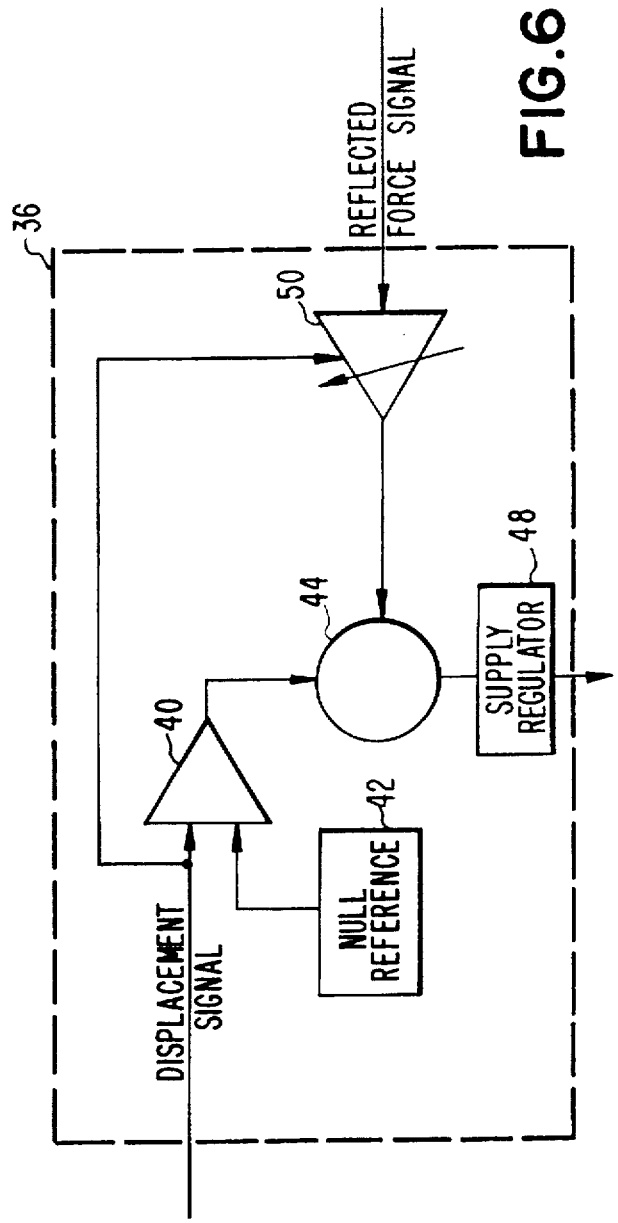

Referring now to FIG. 6, in this embodiment of the invention the force reflected feedback signal is amplified so that its magnitude is proportional to the displacement of the hand-control element. As in the embodiment of FIG. 5, the hand-control element displacement signal is coupled to one input of amplifier 40 the other input to which is coupled to reference 42. The displacement signal input is also coupled to a variable gain amplifier 50 and the gain of this amplifier is increased as the displacement signal input increases and decreased as the signal decreases. The reflected force feedback signal from transducer 34 is coupled to the input of variable amplifier 50, and the output of this amplifier is coupled to the summing junction 44 whose other input is coupled to the output of amplifier 40. The output of the summing junction 44 is coupled to a regulated power supply 48 as in the embodiment of FIG. 5.

Referring now to FIG. 7, this embodiment the invention is similar to the embodiment of FIG. 6. Here a variable gain amplifier 55 scales the sum of the displacement and reflected force feedback signals in proportion to the magnitude of the displacement signal.

Referring now to FIGS. 8 and 9, in this embodiment of the invention the slope of the force vs. displacement curve is varied between limits $A_1$ and $A_2$ in response to the reflected force feedback signal. The reflected feedback signal varies the gain of a variable gain amplifier 56 whose input is coupled to the output of amp.

It will be appreciated that the specific implementations disclosed herein are exemplary. The invention may be implemented using digital processing techniques or may be implemented with hydraulic or pneumatic systems and components. The invention has been described in connection with a single axis controller in order to make clear the explanation of the invention. The invention is applicable to multiple axis controllers, for example, six axis controllers.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A hand-controller for controlling the motion of an object, characterized by:
   position sensing means for providing a position signal that manifests a change in position of the hand-controller;
   first actuator means for moving the object at a velocity that is a function of the magnitude of the position signal;
   force sensing means for providing a force signal that manifests a force applied by the first actuator means to the object;

second actuator means for providing a tactile feel to the hand-controller by applying force to the hand-controller as a function of the magnitude of a control signal; and control means for varying the magnitude of the control signal as a function of the sum of the position signal and the force signal.

2. The hand-controller described in claim 1, further characterized in that:

said control means varies the magnitude of the control signal to require greater force on the hand-controller to increase the velocity of the object when the force applied by the first actuator means is constant and to provide force opposing movement of the hand-controller in proportion to the magnitude of the force opposing the object.

* * * * *